(12) United States Patent
Rachita et al.

(10) Patent No.: US 8,030,397 B2
(45) Date of Patent: Oct. 4, 2011

(54) LIQUID POLYMER

(75) Inventors: Michael Joseph Rachita, North Canton, OH (US); Vanessa Marika Guscoff, Wadsworth, OH (US); Lawson Gibson Wideman, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/263,504

(22) Filed: Nov. 2, 2008

(65) Prior Publication Data

US 2009/0054666 A1    Feb. 26, 2009

Related U.S. Application Data

(62) Division of application No. 10/941,545, filed on Sep. 15, 2004, now Pat. No. 7,482,404.

(60) Provisional application No. 60/545,264, filed on Feb. 17, 2004.

(51) Int. Cl.
*A61K 9/16* (2006.01)
*B60C 1/00* (2006.01)
*C08L 9/00* (2006.01)
*C07C 211/00* (2006.01)

(52) U.S. Cl. .................. 524/543; 524/571; 564/305

(58) Field of Classification Search .................. None
See application file for complete search history.

(56) References Cited

U.S. PATENT DOCUMENTS

| | | |
|---|---|---|
| 3,159,601 A | 12/1964 | Ashby |
| 3,159,662 A | 12/1964 | Ashby |
| 3,220,972 A | 11/1965 | Lamoreaux |
| 4,022,959 A | 5/1977 | Sommer et al. |
| 4,696,986 A | 9/1987 | Halasa et al. |
| 5,272,220 A * | 12/1993 | Rodgers et al. ............ 525/332.3 |
| 6,087,456 A | 7/2000 | Sakaguchi et al. |
| 6,183,551 B1 | 2/2001 | Okamoto et al. |
| 6,191,234 B1 * | 2/2001 | Tadaki et al. ............... 525/332.9 |
| 6,320,010 B1 | 11/2001 | Sakaguchi et al. |
| 6,610,859 B1 | 8/2003 | Brockmann et al. |
| 6,627,721 B1 * | 9/2003 | Rodewald et al. ............ 526/338 |
| 6,686,504 B2 | 2/2004 | Halasa et al. |
| 7,193,013 B2 * | 3/2007 | Machida et al. ................ 525/70 |

FOREIGN PATENT DOCUMENTS

| | | | |
|---|---|---|---|
| EP | 0709403 A1 | | 5/1996 |
| WO | WO02/062889 | * | 8/2002 |

OTHER PUBLICATIONS

Matsushita et al. Macromolecules, 1980, 13 (5), 1053-1058.*

* cited by examiner

*Primary Examiner* — Daniel Sullivan
*Assistant Examiner* — Clinton Brooks
(74) *Attorney, Agent, or Firm* — Alvin T. Rockhill

(57) ABSTRACT

This invention discloses a process for manufacturing an elastomeric article by liquid injection molding, said process comprising the steps of: (I) heating a curable composition comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an amine moiety, (2) a carbonyl inhibited platinum catalyst, and (3) a tetrakis(dialkyl siloxy) silane crosslinking agent, to a temperature which is within the range of 30° C. to 100° C.; (II) injecting the heated curable composition into a mold at a temperature which is within the range of 100° C. to 210° C. to produce the elastomeric article; and (III) removing the elastomeric article from the mold.

17 Claims, No Drawings

LIQUID POLYMER

This is a divisional of U.S. patent application Ser. No. 10/941,545, filed on Sep. 15, 2004 (now issued as U.S. Pat. No. 7,482,404), which claims the benefit of U.S. Provisional Patent Application Ser. No. 60/545,264, filed on Feb. 17, 2004.

BACKGROUND OF THE INVENTION

Elastomeric articles of manufacture are typically made by compressing a solid rubber, such as natural rubber or synthetic rubber, that contains a curative, such as sulfur, into a mold of the desired size and shape. Then, the rubber is cured (vulcanized) in the mold at an elevated temperature which thermosets the rubber permanently into the desired shape. This conventional process is relatively labor intensive in that it requires a mixing step wherein the curative and typically other rubber chemicals are blended into the rubber, a forming step wherein the rubber is compressed into the mold, a curing step wherein the rubber is cured in the mold, and a mold removal step wherein the cured rubber article is removed from the mold. This conventional process cannot be used in manufacturing intricate rubber articles where it is not possible to compress the solid rubber into a mold of the required intricate shape. An additional drawback associated with this conventional technique is that on occasion it is difficult to remove the cured rubber article from the mold and in some cases the article is damaged during its removal from the mold.

Silicone rubbers offer a significant advantage over natural rubber and conventional synthetic polydiene rubbers, such as synthetic polyisoprene rubber, polybutadiene rubber, styrene-butadiene rubber, and the like, in that they can be injection molded into shapes that can be very intricate in design. Injection molding also offers the advantage of being capable of being highly automated to significantly reduce labor requirements. Elastomeric articles made utilizing silicone rubbers can also be compounded to be visually clear which is beneficial in some applications. For instance, clear baby bottle nipples made by injection molding silicone rubber are preferred by many consumers. However, silicone rubbers are typically very expensive when compared to the cost of conventional polydiene rubber. High cost has accordingly precluded silicone rubbers from being used in many products and, of course, adds expense to other products where silicone rubbers are employed.

There is currently a demand for a low cost polymeric composition that can be injection molded to produce elastomeric articles. There is a particular demand for such a polymeric composition that is based upon a polydiene rubber, such as polyisoprene, that can be molded into clear articles.

European Patent Application No. EP 0,709,403 A1 discloses a curable composition for injection molding which comprises, as essential ingredients, (A) a saturated hydrocarbon polymer containing at least one alkenyl group capable of undergoing a hydrosilylation reaction per molecule, (B) a hardener having a molecular weight of 30,000 or lower and containing at least two hydrosilyl groups per molecule, and (C) a hydrosilylation catalyst.

U.S. Pat. No. 6,087,456 discloses a curable composition comprising: (A) an isobutylene polymer which contains per molecule, at least one alkenyl group for reacting with a hydrosilyl group; (B) a curing agent which contains at least two hydrosilyl groups per molecule; (C) a hydrosilylation catalyst; and (D) a hydrocarbon compound having 6 to 20 carbon atoms which contains per molecule, at least one alkenyl or alkynyl group reaction for reacting with a hydrosilyl group.

U.S. Pat. No. 6,183,551 discloses a curable resin composition comprising: (A) saturated hydrocarbon polymer having at least one hydroxyl or hydrolyzable group bonded to a silicone atom and is crosslinkable through the formation of a siloxane bond, in a molecule and (B) a hydrogenated oligomer of a linear $\alpha$-olefin.

U.S. Pat. No. 6,320,010 notes that the main component of such curable compositions is a polymer that can have a very high viscosity depending on the main component species. In particular when an isobutylene polymer is used as the main component, it is difficult to handle the isobutylene polymer as a liquid because of its high viscosity without applying some viscosity reducing technology, although the cured products obtained are excellent in various durability characteristics and, further, have low permeability and good vibration damping properties. Thus, for utilizing such curable compositions as potting agents or coating materials, it is essential to secure fluidity by some or other viscosity reducing technology. The most generally implemented technique for viscosity reduction is the addition of a nonreactive diluent as a plasticizer, for example an oil. In that case, however, while the viscosity is reduced by the addition of the plasticizer, the mechanical strength is markedly lowered and evaporation of the plasticizer at elevated temperatures causes heating loss and volume reduction of cured products, leading to marked changes in mechanical characteristics and, further, induces blooming of the plasticizer. U.S. Pat. No. 6,320,010 further notes that reliability reduction accordingly results in cases where a plasticizer in used for viscosity reduction.

U.S. Pat. No. 6,320,010 more specifically discloses a curable composition which comprises (as essential components): (A) a saturated hydrocarbon polymer having more than one alkenyl group capable of being hydrosilylated, on average, in each molecule and having a molecular weight of 2,000 to 50,000, (B) a component comprising a compound containing more than two silicone atom-bound hydrogen atoms, on average, in each molecule, (C) a compound having, within the molecule, one alkenyl group capable of being hydrosilylated, (D) a compound having, within the molecule, at least two alkenyl groups capable of being hydrosilylated and having a molecular weight less than 2,000, and (E) a hydrosilylation catalyst.

SUMMARY OF THE INVENTION

The present invention relates to a polymeric molding composition that is comprised of (1) a liquid polymer having repeat units that are derived from a conjugated diolefin monomer, wherein said liquid polymer has a weight average molecular weight which is within the range of 5,000 to 100,000, and wherein the liquid polymer is functionalized with an amine moiety, (2) a hydrosilylation catalyst, and (3) a crosslinking agent having at least 2 hydrosilyl groups per molecule. This polymeric composition has the advantage of being based upon a polydiene rubber which reduces raw material cost as compared to silicone rubbers. It can also be formulated for utilization in automated injection molding equipment to reduce labor costs. The polymeric molding compositions of this invention can also be manufactured into elastomeric articles having outstanding physical properties that are visually clear.

The polymeric compositions of this invention have the requisite combination of properties needed to replace liquid silicone rubbers in liquid injection molding applications.

More specifically, the injection molding compositions of this invention are stable for at least 2 weeks at room temperature and are stable at 100° C. for at least 2 minutes. They are also pumpable with good shear thinning characteristics and can be cured in 2 minutes to provide a vulcanized rubber article that exhibits good clarity (clear and colorless), is odor free, and free of extractables. Elastomeric articles made with the polymeric compositions of this invention can also be formulated to have a Die C tear strength of over 100 ppi and a tensile strength of at least 1000 psi without being sticky and with stable shelf clarity.

The present invention more specifically discloses a liquid polymer that is particularly useful in molding elastomeric articles, said liquid polymer being comprised of repeat units that are derived from a conjugated diolefin monomer, wherein said liquid polymer has a weight average molecular weight which is within the range of 5,000 to 100,000, and wherein the liquid polymer is functionalized with an amine moiety.

The subject invention further reveals a curable composition which is comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an amine moiety, (2) a hydrosilylation catalyst, and (3) a crosslinking agent having at least 2 hydrosilyl groups per molecule.

The present invention also reveals a curable composition for utilization in liquid injection molding, said composition being comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an amine moiety, (2) a carbonyl inhibited platinum catalyst, and (3) a tetrakis(dialkyl siloxy) silane crosslinking agent.

The present invention also reveals a process for manufacturing an elastomeric article by liquid injection molding, said process comprising the steps of: (I) heating a curable composition comprised of (1) a liquid polymer comprised of repeat units that are derived from a conjugated diolefin monomer, wherein said liquid polymer has a weight average molecular weight which is within the range of 5,000 to 100,000, and wherein the liquid polymer is functionalized with an amine moiety, (2) a carbonyl inhibited platinum catalyst, and (3) a tetrakis(dialkyl siloxy) silane crosslinking agent, to a temperature which is within the range of 30° C. to 100° C.; (II) injecting the heated curable composition into a mold at a temperature which is within the range of 100° C. to 210° C. to produce the elastomeric article; and (III) removing the elastomeric article from the mold.

DETAILED DESCRIPTION OF THE INVENTION

The liquid polymers of this invention are comprised repeat units that are derived from at least one conjugated diolefin monomer. The conjugated diolefin monomers that can be utilized in the liquid polymers of this invention are of the general structural formula:

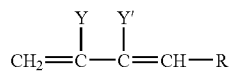

wherein R is selected from the group consisting of hydrogen atoms, alkyl groups (including cycloalkyl groups), alkaryl groups, or aryl groups containing from 1 to about 8 carbon atoms, and wherein Y and Y' can be the same or different and represent hydrogen atoms or alkyl groups containing from 1 to about 4 carbon atoms. Some representative examples of conjugated diolefin monomers that can be polymerized with the catalyst systems of this invention include 1,3-butadiene, isoprene, piperylene, 2-methyl-1,3-pentadiene, 2-ethyl-1,3-butadiene, 4-butyl-1,3-pentadiene, 2,3-dimethyl-1,3-pentadiene, 1,3-hexadiene, 1,3-octadiene, 1-phenyl-1,3-butadiene, and the like. Additional monomers that are copolymerizable with conjugated dieoefin monomers can also be incorporated into the liquid polymers of this invention. For instance, repeat units that are derived from vinyl aromatic monomers, such as styrene and α-methyl styrene can also be incorporated into the liquid polymers of this invention. It should be noted that a double bond is consumed in the polymerization of such monomers and that repeat units that are derived from a given monomer differ from the monomer in that the double bond is not present in the repeat unit.

The liquid polymers of this invention have a weight average molecular weight this is within the range of 5,000 to 100,000. A weight average molecular weight of at least 5,000 is required to attain needed physical properties. On the other hand, the weight average molecular weight of the polymer cannot be more than 100,000 or the polymer begins to become a solid and is not easily pumpable which is, of course needed in injection molding applications. The liquid polyisoprene rubbers of this invention will typically have a minimum weight average molecular weight of at least 20,000. In any case, it is preferred for the liquid polymers of this invention to have a weight average molecular weight that is within the range of 20,000 to 80,000. It is more preferred for the liquid polymers of this invention to have a weight average molecular weight that is within the range of 30,000 to about 50,000.

It is essential for the liquid polymers of this invention to be functionalized with an amine to unexpectedly attain the needed level of pumpability. By including an amine in the liquid polymer of this invention it can be employed in making curable compositions that are free of plasticizers, such as oils. Amine functionalization can be accomplished by synthesizing the polymer with a functionalized initiator, by polymerizing an amine group containing monomer into the polymer, by terminating the polymerization with an amine containing terminating agent, or by grafting an amine containing moiety onto the polymer in a post-polymerization step.

U.S. Pat. No. 6,610,859 and U.S. Pat. No. 6,686,504 describe the synthesis of amine group containing initiators and the utilization of such initiators in the synthesis of rubbery polymers. The teachings of U.S. Pat. No. 6,610,859 and U.S. Pat. No. 6,686,504 are incorporated herein by reference with respect to the synthesis and utilization of such initiators in the synthesis of polymers. U.S. Pat. No. 6,610,859 specifically discloses amine functionalized initiators that can be utilized in the practice of this invention to incorporate an amine moiety onto the liquid polymer. These initiators are of the structural formula:

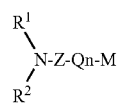

wherein M is an alkali metal selected from the group consisting of lithium, sodium and potassium; wherein Z is a branched or straight chain hydrocarbon connecting group which contains 3-25 carbon atoms, optionally substituted with aryl or substituted aryl; wherein Q is a saturated or unsaturated hydrocarbyl group derived by the incorporation of one or more unsaturated organic compounds into the M-Z linkage; wherein n is an integer from 0 to 5; wherein $R^1$ is selected from the group consisting, of aralkyl, allyl, tertiary alkyl and methyl groups; wherein $R^2$ is the same as $R^1$, with the proviso that when $R^1$ is methyl, $R^2$ is not an alkyl group containing from 1 to 4 carbon atoms, or when $R^1$ is aralkyl, $R^2$ is not aralkyl, or $R^2$ is different from $R^1$ and selected from the group consisting of alkyl, substituted alkyl, alkoxy, substituted alkoxy, aryl, substituted aryl, heteroaryl, substituted heteroaryl, cycloalkyl, substituted cycloalkyl, heterocloalkyl, and substituted heterocycloalkyl, with the proviso that when R is not the same as $R^1$, then $R^2$ is more stable under conditions used to remove $R^1$, or $R^1$ and $R^2$ together with the nitrogen atom to which they are attached form

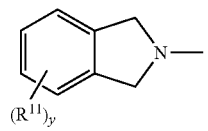

wherein y is from 1 to 4 and each $R^{11}$ is independently selected from the group consisting of hydrogen, alkyl, substituted alkyl, aryl, substituted aryl, cycloalkyl, substituted cycloalkyl, alkoxy, substituted alkoxy, heteroaryl, substituted heteroaryl, heterocycloalkyl, and substituted heterocycloalkyl groups.

U.S. Pat. No. 6,627,721 described the synthesis of amine group containing monomers and the utilization of such monomers in the synthesis of polymers. The teachings of U.S. Pat. No. 6,627,721 are also incorporated herein by reference with respect to the synthesis of such amine functionalized monomers and their incorporation into polymers. Generally, such amine containing monomers will typically be incorporated into the liquid polymers of this invention at a level which is within the range of about 0.1 weight percent to about 5 weight percent. The amine group containing monomer will more typically be incorporated into the liquid polymers of this invention at a level which is within the range of about 0.3 weight percent to about 3 weight percent, and will preferably be incorporated at a level of 0.5 weight percent to 1 weight percent.

U.S. Pat. No. 6,627,721 specifically discloses a rubbery polymer which is comprised of repeat units that are derived from (1) at least one conjugated diolefin monomer, and (2) at least one functionalized monomer having of the structural formula:

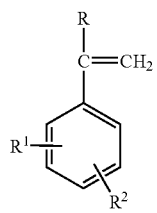

wherein R represents an alkyl group containing from 1 to about 10 carbon atoms or a hydrogen atom, and wherein $R^1$ and $R^2$ can be the same or different and represent hydrogen atoms or a moiety selected from the group consisting of

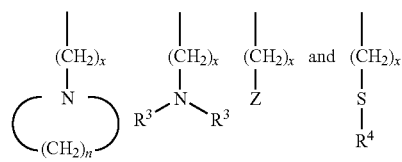

wherein $R^3$ groups can be the same or different and represent alkyl groups containing from 1 to about 10 carbon atoms, aryl groups, allyl groups, and alkyloxy groups of the structural formula —$(CH_2)_y$—O—$(CH_2)_z$—$CH_3$, wherein Z represents a nitrogen containing heterocyclic compound, wherein $R^4$ represents a member selected from the group consisting of alkyl groups containing from 1 to about 10 carbon atoms, aryl groups, and allyl groups, and wherein n, x, y and z represents integers from 1 to about 10, with the proviso that $R^1$ and $R^2$ can not both be hydrogen atoms. U.S. Pat. No. 6,627,721 identifies the following heterocyclic amine moieties (Z groups) as being suitable for utilization in such amine functionalized monomers:

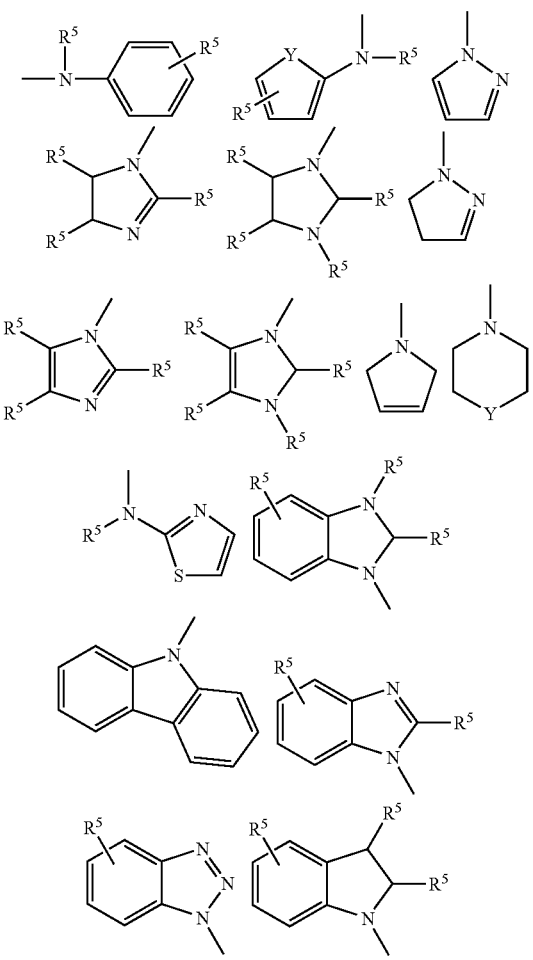

wherein $R^5$ groups can be the same or different and represent a member selected from the group consisting of alkyl groups containing from 1 to about 10 carbon atoms, aryl groups, allyl groups, and alkoxy groups, and wherein Y represents oxygen, sulfur, or a methylene group.

It has been unexpectedly discovered that the cure rate of the liquid polymers of this invention can be greatly enhanced without sacrificing stability (scorch safety) at lower temperatures by increasing the level of vinyl microstructure in the polymer. In other words, the liquid polymer will cure faster at a temperature above 100° C. while remaining relatively stable at temperatures of less than 100° C. This unexpected benefit is attained at vinyl contents of greater than 7 percent and is further enhanced at vinyl contents of greater than 15 percent. It is normally preferred for the liquid polymer to have a vinyl microstructure content that is within the range of 15 percent to 20 percent.

The vinyl microstructure content of the liquid polymer can be increased by conducting the polymerization used in its synthesis in the presence of a polymerization modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, ditetrahydro-furylpropane, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like.

The polymerization modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, ditetrahydro-furylpropane, dimethyl ether and tetrahydrofuran are representative of highly preferred modifiers of this type. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from conjugated diolefin monomers is a function of the polymerization temperature and the amount of polar modifier present. For example, it is known that higher temperatures result in lower vinyl contents (lower levels of 1,2-microstructure). Accordingly, the polymerization temperature, quantity of modifier and specific modifier selected will be determined with the ultimate desired microstructure of the liquid polymer being synthesized being kept in mind.

The vinyl microstructure content of the liquid polymer can also be increase by copolymerizing a monomer containing at least 2 vinyl groups into the polymer. A preferred monomer containing 2 vinyl groups is 1-ethenyl-4-(3-butenyl)benzene since it copolymerized with conjugated diolefin monomers but does not form crosslinks that can lead to gel formation during polymerization. It is of the structural formula:

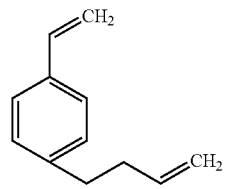

and is preferred because its vinyl group will polymerize during anionic polymerization but its 3-butenyl group will not. However, the 3-butenyl group is available for crosslinking in the presence of a hydrosilylation catalyst during the curing step.

Curable compositions that are suitable for use in molding applications can be made by blending the liquid polymers of this invention with a hydrosilylation catalyst and a crosslinking agent. The crosslinking agent will typically be used at a level which is within the range of 0.5 phr (parts by weight per 100 parts by weight of the liquid rubber) to 10 phr. The crosslinking agent will preferably be present in the curable composition at a level which is within the range of 1 phr to 7 phr. The hydrosilylation catalyst will typically be employed at a level which is within the range of 1 ppmr (parts of metal catalyst by weight per 1,000,000 parts by weight of the liquid rubber) to 100 ppmr. The hydrosilylation catalyst will preferably be present in the curable composition at a level which is within the range of 10 ppmr to 50 ppmr. In curable compositions that are used in injection molding applications the crosslinking agent will normally be present at a level which is within the range of 2 phr to 5 phr and the hydrosilylation catalyst will normally be present at a level which is within the range of 15 ppmr to 30 ppmr. However, it should be noted that the exact level of crosslinking agent and catalyst required will depend upon the characteristics of the liquid polymer and will normally be decreased with increasing levels of vinyl microstructure content in the liquid polymer.

The crosslinking agents that can be used in the practice of this invention have at least 2 hydrosilyl groups per molecule. Crosslinking agents of this type are described in detail in U.S. Pat. No. 6,087,456. The teachings of U.S. Pat. No. 6,087,456 are incorporated herein by reference with respect to teaching the type of crosslinking agent (curing agent) that can be utilized in the practice of this invention. Some preferred branched crosslinking agents are of the structural formula:

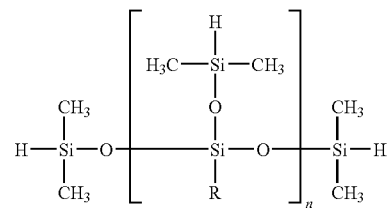

wherein n represents an integer from 1 to about 3, wherein R represents an alkyl group containing from 1 to 4 carbon atoms, a phenyl group, or a hydrosilyl group. The crosslinking agent will typically be a tetrakis(dialkyl siloxy) silane or a tris(dialkyl siloxy) alkyl silane. The crosslinking agent will more typically be a branched silane coupling agent such as tetrakis(dimethyl siloxy) silane, tris(dimethyl siloxy)methyl silane, and tris(dimethyl siloxy)phenyl silane.

A wide variety of hydrosilylation catalysts can be used in making the curable compositions of this invention. Some representative examples of suitable hydrosilylation catalysts include chloroplatinic acid, elemental platinum, solid platinum supported on a carrier (such as alumina, silica or carbon black), platinum-vinylsiloxane complexes {for instance: $Pt_n(ViMe_2SiOSiMe_2Vi)_n$ and $Pt[(MeViSiO)_4]_m$}, platinum-phosphine complexes {for example: $Pt(PPh_3)_4$ and $Pt(PBu_3)_4$}, and platinum-phosphite complexes {for instance: $Pt[P(OPh)_3]_4$ and $Pt[P(OBu)_3]_4$}, wherein Me represents methyl, Bu represents butyl, Vi represents vinyl and Ph represents phenyl, and n and m represent integers. The platinum-hydrocarbon complex described in the specification of U.S. Pat. No. 3,159,601 and U.S. Pat. No. 3,159,662, and the platinum-alcoholate catalyst described in the specification of U.S. Pat. No. 3,220,972 can also be used. The teaching of U.S. Pat. No. 3,159,601, U.S. Pat. No. 3,159,662, and U.S. Pat. No. 3,220,972 are incorporated herein by reference.

Hydrosilylation catalysts containing metals other than platinum can also be used in the practice of this invention of the moldable composition if being used in an application other than injection molding. Some representative examples of such catalysts include: $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$, and the like. These catalysts can be used alone or in combination. In view of catalytic activity, chloroplatinic acid, platinum-olefin complex, platinum-vinylsiloxane complex, and $Pt(acac)_2$, are preferable.

Inorganic fillers can also be added to the moldable compositions of this invention to enhance physical properties. Some representative examples of inorganic fillers that can be used include calcium carbonate, talc, silica, carbon black and other ordinary inorganic fillers. Silica fillers will typically be added at a level which is within the range of 5 phr to 40 phr and will preferably be added at a level of 15 phr to 30 phr. Since the curable composition of the present invention is formed by crosslinking by a hydrosilylation reaction, however, influences on the hydrosilylation reaction should be taken into consideration in using such a filler. For instance, if the filler has a high content of absorbed moisture, the moisture will react with the curing agent, which can result in foaming during the curing step. When the filler contains a component capable of interfering with the hydrosilylation reaction, for example a nitrogen and/or sulfur atom, a reduction in curability or insufficient curing may result. Some fillers can have an influence on the storage stability of the curable composition. In using such an inorganic filler, it is important to confirm the influence of the inorganic filler on the curability and/or storage stability beforehand. If visual clarity is being sought it is also, of course, important to avoid fillers that will significantly reduce the clarity of the composition, such as carbon black.

One or more of antioxidants, ultraviolet absorbers, pigments, surfactants and other additives can also be incorporated in the molding compositions of this invention in appropriate amounts. Again, the influence of these agents on the hydrosilylation reaction should also be taken into consideration.

Moldable compositions that are used in injection molding applications will employ a carbonyl inhibited platinum catalyst and a tetrakis(dialkyl siloxy) silane crosslinking agent. In injection molding applications the molding composition will be heated to an elevated temperature which is within the range of 30° C. to 100° C. to facilitate the pumping of the moldable composition and injecting it into a mold. The molding composition will preferably be heated to a temperature within the range of 40° C. to 80° C. for pumping and injection into the mold. The mold used will, of course, be of the desired shape for the elastomeric article being manufactured. The mold will be maintained at a temperature which is within the range of 100° C. to 210° C. to cure the polymeric composition. The mold will preferably be maintained at a temperature of 120° C. to 180° C. until the molding composition is cured. After the polymeric composition has been cured or at least substantially cured, the elastomeric article made will be removed from the mold.

EXAMPLES

The following series of examples is intended to be illustrative of the polymer synthesis, compounding, and mixing procedure used with liquid polymers and is not intended to limit the scope of the invention, nor are they intended to limit the method of polymer synthesis, compounding, or mixing of the materials. One skilled in the art of polymer synthesis, compounding, and mixing realizes that a number of methods may be used to obtain the same results and give the desired compound paste without parting from the spirit or intent of the present invention.

The following examples serve to demonstrate the unexpected reduction in compound viscosity and increased clarity when an amine containing liquid polyisoprene is used as the base polymer in a curable composition.

Polymer Synthesis:

Low molecular weight polyisoprene was synthesized in a one-gallon batch reactor equipped with a variable speed agitator and a heating/cooling jacket to control reactor temperature via a Foxboro distributed control system. Reaction conditions included moderate stirring under an inert atmosphere (nitrogen at 40 psi) at 65° C. Prior to premix loading, the reactor was filled with dry hexane and quenched with n-BuLi to minimize the scavenger level. Approximately 2,000 grams of 15 weight percent isoprene premix was charged into the reactor. The appropriate amount and type of initiator is charged into the reactor via a syringe to achieve the desired functionality and molecular weight. After 2 hours at 65° C. the reaction was shortstopped with 1.0 molar equivalent isopropanol (or functional terminator if desired) and 0.50 phr BHT antioxidant. Polymer is recovered after devolatilization in a forced air oven and checked for molecular weight (Table 1).

Polymer Characterization:

Size-exclusion chromatography (SEC) was performed using a Wyatt Technologies miniDawn light scattering detector coupled with a Hewlett Packard 1047A refractive index detector. Two Polymer Laboratories C microgel columns in series were utilized with tetrahydrofuran as the carrier solvent at a flow rate of 0.7 ml/min and a column temperature of 40° C. Sample preparation involved filtering a 0.12 weight percent solution of polymer in THF through a 1.0 micron filter prior to injection. Polystyrene standards were used to calibrate the instrument.

TABLE 1

Series of liquid polyisoprenes containing different functional groups.

| Functional Group | Mn (g/mol) | Mw (g/mol) | MWD | Volatiles (%) | Yield (g) |
|---|---|---|---|---|---|
| H | 50,940 | 55,210 | 1.08 | 0.4 | 340.5 |
| OH | 46,810 | 51,900 | 1.11 | 0.39 | 360.7 |
| SiOEt | 52,160 | 56,330 | 1.08 | 0.3 | 362 |
| DimethylAmine | 51,310 | 53,470 | 1.04 | 0.31 | 350 |

TABLE 1-continued

Series of liquid polyisoprenes containing different functional groups.

| Functional Group | Mn (g/mol) | Mw (g/mol) | MWD | Volatiles (%) | Yield (g) |
|---|---|---|---|---|---|
| Pyrrolidino | 45,230 | 46,120 | 1.02 | 0.39 | 349 |
| tButoxy | 52,200 | 53,260 | 1.02 | 0.3 | 366 |
| tBuMe2SiO— | 51,120 | 52,690 | 1.03 | 0.2 | 342.6 |

Curing Process:

A liquid polymer (37.0 grams) from the above table is weighed directly into a polyethylene pre-blend 1 liter vessel, followed by the addition of 4.0 phr (1.48 grams) of liquid tetrakis(dimethylsiloxy)silane. The liquid polymer and liquid silane tetrahydride were mixed for 10 minutes at room temperature to give a homogenous rubber-silane hydride compound. A silica filler, 10 phr (3.7 grams) of Degussa Aerosil 200 (200 $m^2$ g) fumed silica, was then added to the pre-blend vessel containing the liquid rubber compound and mixed for 10 minutes at room temperature with low agitation. A liquid platinum zero complex was then added to the compound, 750 ppm (0.03 grams) of a platinum carbonyl complex with a 3-3.5 percent platinum concentration in vinyl terminated polydimethyl siloxane, and mixing was continued for an additional 10 minutes. An additional 20 phr (7.4 grams) of the Aerosil silica filler was added and mixed for an additional 10 minutes, and then poured into a 0.3-liter stainless steel Waring mixer. The rubber compound was mixed in the Waring mixer at room temperature until a translucent/white paste resulted, usually about 10 minutes. A 5.0 gram portion of the compound paste was run on a Alpha 2000 RPA, isothermally at 180° C. for 30 minutes, to obtain the cure profile of the rubber, the time for 90% of the cure to result, and S'min and S'max as a measure of compound viscosity. RPA frequency sweeps were also used to obtain viscosity profiles for the rubber paste. A 30.0 gram portion of the paste was then cured between Mylar sheets in a cure press at 9 tons of pressure at 180° C. for T90+1 minutes to give a clear and colorless cured rubber sheet from which Die C tear strength and tensile dumbbells were prepared. Paste and cured compound properties for the series of liquid polyisoprenes in Table 1 can be found in Table 2. Both amine-containing polymers provide compounds with significantly reduced viscosity.

TABLE 2

Paste and compound properties of functionalized liquid polyisoprenes

| Functional Group | T90 (min) | S'min (dNm) | S'max (dNm) | tensile (psi) | tear (ppi) | EB (%) |
|---|---|---|---|---|---|---|
| H | 2.14 | 2.18 | 16.5 | 1,054 | 88 | 139 |
| OH | 3.4 | 1.89 | 12.2 | 957 | 89 | 160 |
| SiOEt | 4.31 | 1.37 | 9.5 | 980 | 79 | 181 |
| tButoxy | 3.47 | 4.78 | 18.6 | 1,102 | 114 | 207 |
| tBuMe2SiO— | 3.3 | 2.25 | 14.4 | 951 | 79 | 161 |
| DimethylAmine | 3.59 | 0.007 | 3.1 | 691 | 87 | 198 |
| Pyrrolidino | 4.42 | 0.025 | 2.2 | 212 | 41 | 116 |

As Table 3 shows optimization of the cure formulation for the Pyrrolidino containing liquid polyisoprene material allows for increased tensile, tear, and elongation without negatively impacting the amines effect on compound viscosity.

TABLE 3

Cure optimization of pyrrolidino-liquid polyisoprene

| Pt level (ppm) | Silane (phr) | tensile (psi) | tear (ppi) | EB (%) | S'min (dNm) |
|---|---|---|---|---|---|
| 23 | 4 | 212 | 41 | 116 | 0.025 |
| 23 | 5 | 895 | 79 | 206 | 0.001 |
| 30 | 4 | 347 | 53 | 127 | 0.033 |
| 30 | 5 | 607 | 94 | 180 | 0.031 |
| 30 | 6 | 1013 | 90 | 164 | 0.004 |

As Table 4 shows, amine functionality significantly increases the cured compound's clarity as a measure of percent transmittance of light through the part. The percent transmittance was determined using a HACH DR4000U spectrophotometer in the tristimulus mode.

TABLE 4

Improve clarity through amine functionalization

| Functional Group | S'min (dNm) | % Transmittance |
|---|---|---|
| H | 2.18 | 25.8 |
| OH | 1.89 | 30.2 |
| SiOEt | 1.37 | 26.3 |
| tButoxy | 4.78 | 23 |
| TBDMS | 2.25 | 22.9 |
| DimethylAmino | 0.007 | 61 |
| DimethylAmino (repeat) | 0.005 | 63.7 |
| Pyrrolidine | 0.025 | 68.2 |

As Table 5 shows amine functionality can be introduced into the liquid polymer in any manner including through the use of amine bearing styrenic co-monomer technology. As little as 0.5 percent incorporation of a pyrrolidino bearing styrene co-monomer allows for significant reduction in paste viscosity as measured by low frequency RPA. At 6 cpm a control unfunctionalized polyisoprene paste has a viscosity of over 200,000 Pas and S'min of 2.8 dNm. The amine functionalized counterpart at equal molecular weight, however, has a low frequency viscosity of just 11,800 Pas with S'min of 0.002 dNm.

TABLE 5

Use of amine bearing vinyl styrenic co-monomer to reduce compound viscosity

| Polymer Type | T90 (min) | S'min (dNm) | n'@6 cpm | n'@1800 cpm | Tear (ppi) | Tensile (psi) |
|---|---|---|---|---|---|---|
| H-control (50K) | 2.4 | 1.61 | 183,000 Pas | 2011 | 78 | 768 |
| 1% styrene | 2.63 | 2.8 | 203,000 | 2140 | 97 | 1036 |
| 1% pyrrolidino-sty | 1.6 | 0.002 | 11,800 | 1390 | 75 | 585 |
| H-control (40K) | 3.4 | 2.43 | 191,000 | 1763 | 92 | 846 |
| 0.5% pyrrolidino-sty | 2.2 | 0.031 | 13,800 | 716 | 67 | 689 |

The following examples serve to demonstrate the unexpected reduction in T90 times and improved physical properties when liquid polyisoprene is used as the base polymer in a curable composition with increased 3,4-vinyl content.

Table 6 shows the significant drop in T90 time to cure for liquid polyisoprene pastes modified in 3,4-vinyl content. As 3,4-vinyl content is increased from 7% to 18%, while maintaining a constant molecular weight of 50,000 g/mol, T90 drops from 2.7 minutes to 1.1 minutes at equal Pt and silane levels. Decreased T90 times allow for further optimization of the silane level in the 18% 3,4-vinyl compound resulting in an increase from 55 to 120 tear as silane is dropped from 4 to 2 phr. Elongation at break is also improved as silane levels are reduced without negatively impacting the improved T90 times.

TABLE 6

Decrease in T90 with increase in 3,4-vinyl content for 50K molecular weight liquid-PI

| % 3,4- | Pt/Silane | T90 (min) | S'min (dNm) | tear (ppi) | Tensile (psi) | EB (%) |
|---|---|---|---|---|---|---|
| 7% | 23/4 | 2.7 | 2.2 | 88 | 1054 | 139 |
| 11% | 23/4 | 1.9 | 1.29 | 65 | 771 | 112 |
| 18% | 23/4 | 1.1 | 2.49 | 55 | 1104 | 113 |
| 18% | 23/3 | 0.81 | 2.41 | 89 | 1087 | 156 |
| 18% | 23/2 | 1.06 | 2.9 | 120 | 1103 | 254 |

Table 7 shows the significant drop in T90 time to cure for liquid polyisoprene pastes modified with a vinyl bearing co-monomer. When a 50,000 g/mol liquid polyisoprene with 1% incorporated 4-butenyl-vinylbenzene is compounded T90 drops from 2.7 minutes to 1.9 minutes at equal Pt and silane levels versus control polymers. Decreased T90 times allows for further optimization of the silane level in the vinyl bearing polymer resulting in an increase in tear and elongation as silane levels are reduced without negatively impacting the improved T90 times.

TABLE 7

Decrease in T90 through vinyl bearing co-monomers for 50K molecular weight liquid-PI

| Polymer Type | Pt/Silane | T90 (min) | tear (ppi) | tensile (psi) | EB (%) |
|---|---|---|---|---|---|
| 50K PI-H control | 23/4 | 2.7 | 88 | 1054 | 139 |
| 1% SIR 50K control | 23/4 | 2.63 | 97 | 1036 | 196 |
| 1% BVB-PI | 23/4 | 1.94 | 96 | 994 | 159 |
| 1% BVB-PI | 23/3 | 1.15 | 125 | 829 | 179 |
| 1% BVB-PI | 23/2 | 1.16 | 92 | 504 | 256 |

As Table 8 demonstrates a number of concepts can be combined to achieve synergistic improvements in paste viscosity, T90 and physical properties. A dimethylamino containing 50K liquid polyisoprene with 25% 3,4-vinyl content was prepared and compounded as described in example 1. The amine/3,4-vinyl modified material gave a fast T90 of 0.59 minutes combined with a low S'min of 0.08 (dNm) while maintaining good physical properties.

TABLE 8

Combining amine functionality with increased 3,4-vinyl content

| Polymer Type | T90 (min) | S'min (dNm) | Tear (ppi) | Tensile (psi) | EB (%) |
|---|---|---|---|---|---|
| Dimethylamine/25% 3,4- | 0.59 | 0.08 | 93 | 1074 | 226 |

While certain representative embodiments and details have been shown for the purpose of illustrating the subject invention, it will be apparent to those skilled in this art that various changes and modifications can be made therein without departing from the scope of the subject invention.

What is claimed is:

1. A liquid polymer that is particularly useful in molding elastomeric articles, said liquid polymer being comprised of repeat units that are derived from a conjugated diolefin monomer and an amine functionalized monomer, wherein said liquid polymer has a weight average molecular weight which is within the range of 5,000 to 100,000, wherein the liquid polymer is a random copolymer of the conjugated diolefin monomer and the amine functionalized monomer, wherein said liquid polymer has a vinyl microstructure content which is within the range of 7 percent to 20 percent, wherein the liquid polymer is pumpable, and wherein the amine functionalized monomer is of the structural formula:

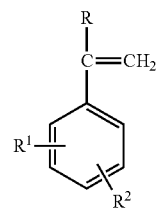

wherein R represents an alkyl group containing from 1 to about 10 carbon atoms or a hydrogen atom, and wherein $R^1$ and $R^2$ can be the same or different and represent hydrogen atoms or a moiety selected from the group consisting of

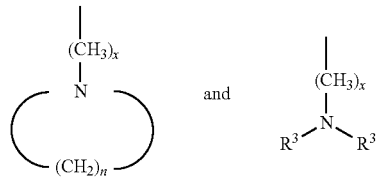

wherein $R^3$ groups can be the same or different and represent alkyl groups containing from 1 to about 10 carbon atoms, and wherein n and x represent integers from 1 to about 10, with the proviso that $R^1$ and $R^2$ can not both be hydrogen atoms.

2. A liquid polymer as specified in claim 1 wherein the liquid polymer has a weight average molecular weight of at least 20,000.

3. A liquid polymer as specified in claim 1 wherein the liquid polymer has a weight average molecular weight which is within the range of 20,000 to 80,000.

4. A liquid polymer as specified in claim 1 wherein the liquid polymer has a weight average molecular weight which is within the range of 30,000 to 50,000.

5. A liquid polymer as specified in claim 4 wherein the liquid polymer has a vinyl microstructure content which is within the range of 15 percent to 20 percent.

6. A liquid polymer as specified in claim 1 wherein the liquid polymer is further comprised of repeat units that are derived from 1-ethenyl-4-(3-butenyl)benzene.

7. A liquid polymer as specified in claim 4 wherein the amine functionalized monomer is incorporated into the liquid polymer at a level which is within the range of about 0.1 weight percent to about 5 weight percent.

8. A liquid polymer as specified in claim 4 wherein the amine functionalized monomer is incorporated into the liquid polymer at a level which is within the range of about 0.3 weight percent to about 3 weight percent.

9. A liquid polymer as specified in claim 4 wherein the amine functionalized monomer is incorporated into the liquid polymer at a level which is within the range of about 0.5 weight percent to about 1 weight percent.

10. A liquid polymer as specified in claim 1 wherein the conjugated diolefin monomer is isoprene.

11. A liquid polymer as specified in claim 1 wherein the liquid polymer is further comprised of repeat units which are derived from a vinyl aromatic monomer.

12. A liquid polymer as specified in claim 11 wherein the vinyl aromatic monomer is styrene.

13. A liquid polymer as specified in claim 1 wherein $R^1$ and $R^2$ can be the same or different and represent hydrogen atoms or a moiety of the formula:

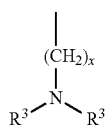

wherein x represents an integer from 1 to about 10, and wherein $R^3$ groups can be the same or different and represent alkyl groups containing from 1 to about 10 carbon atoms.

14. A liquid polymer as specified in claim 4 wherein the liquid polymer is further comprised of repeat units that are derived from 1-ethenyl-4-(3-butenyl)benzene.

15. A liquid polymer as specified in claim 1 wherein the conjugated diolefin monomer consists of isoprene.

16. A liquid polymer as specified in claim 1 wherein the liquid polymer consists of repeat units that are derived from isoprene, the amine functionalized monomer, and 1-ethenyl-4-(3-butenyl)benzene.

17. A liquid polymer as specified in claim 1 wherein the liquid polymer consists of repeat units that are derived from the conjugated diolefin monomer and the amine functionalized monomer.

* * * * *